Feb. 6, 1962 R. F. PFOST 3,020,359

TAPE TRANSDUCING APPARATUS

Filed Oct. 11, 1957 4 Sheets-Sheet 1

INVENTOR.
ROBERT F. PFOST

BY Flehr and Swain

ATTORNEYS

TAPE TRANSDUCING APPARATUS

Filed Oct. 11, 1957 4 Sheets-Sheet 2

INVENTOR.
ROBERT F. PFOST
BY Fisher & Swain
ATTORNEYS

Feb. 6, 1962 R. F. PFOST 3,020,359

TAPE TRANSDUCING APPARATUS

Filed Oct. 11, 1957 4 Sheets-Sheet 3

INVENTOR.
ROBERT F. PFOST

BY [signature]

ATTORNEYS

Feb. 6, 1962 R. F. PFOST 3,020,359

TAPE TRANSDUCING APPARATUS

Filed Oct. 11, 1957 4 Sheets-Sheet 4

INVENTOR.
ROBERT F. PFOST

BY Flehr & Swain

ATTORNEYS 3,020,359

TAPE TRANSDUCING APPARATUS

Robert Fred Pfost, Mountain View, Calif., assignor to Ampex Corporation, Redwood City, Calif., a corporation of California Filed Oct. 11, 1957, Ser. No. 689,594
3 Claims. (Cl. 179—100.2)

This invention relates generally to transducing apparatus making use of a pliable tapelike record medium. It is applicable for recording and/or reproducing signal intelligence over a wide frequency spectrum, including for example video frequencies.

In copending applications Serial No. 524,004, filed July 25, 1955, now Patent No. 2,956,114, issued October 11, 1960, and Serial No. 427,138 filed May 3, 1954, now Patent No. 2,916,546, issued December 8, 1959, there is disclosed a system and apparatus making use of a rotary head assembly for recording and/or reproducing signals over a wide frequency spectrum. One practical use for such a system is the recording and/or reproduction of television programs. The head assembly employed comprises a plurality of transducer units that are mounted to rotate and sweep across a pliable tapelike record medium, such as a magnetic tape. Special means are employed for driving the head assembly and the magnetic tape to insure proper control of the speed of rotation of the head and tape speed across the head, and to insure proper tracking during playback.

Systems of the above type necessarily involve separate recorded track portions extending across the tape, each track portion being formed by the sweep of a transducer unit. During playback, current variations provided by each unit as it sweeps across a track portion are combined in an electronic circuitry to form a composite signal. With reference particularly to broad band (e.g. video) applications, the accuracy with which the signal is recorded and reproduced is dependent among other things upon the mechanical accuracy with which the rotary head is constructed. Slight differences in the angular spacing between the tips of the transducer units cause inaccuracies in the reproduced composite signal. Assuming the reproduction of recorded video signals on a screen, such inaccuracies are evidenced by horizontal shifting between horizontal bands of the picture.

One arrangement serving to compensate for such mechanical inaccuracies employs delay lines in the connections to the several transducer units, as disclosed in copending application Serial No. 552,868, filed December 13, 1955, now Patent No. 2,921,990, issued January 19, 1960. However delay lines require additional circuitry which adds considerably to the cost and complications of the system. Also if the same equipment is to be used for both recording and playback operations, separate delay lines must be used in each instance.

A further problem involved in the construction and operation of such head assemblies is that relatively high speeds of rotation are required whereby the transducer units and associated parts are subjected to considerable centrifugal force. The head assembly should be constructed in such a manner that inaccuracies do not develop in usage, other than such inaccuracies as may be inherent in gradual wear of the transducer units. The structural features of such a head assembly should in addition permit a high degree of precision at the time of manufacture without undue expense. The size of the individual units must be relatively small, while transducing efficiency should be relatively high over the frequency range for which the apparatus is to be used.

Aside from the foregoing, various problems are involved in the construction of the complete transducing apparatus, including the mounting of the tape guide whereby it can be shifted and adjusted relative to the head.

In general it is an object of the present invention to provide a rotary head assembly of the above character which makes possible accurate angular spacing of the transducer units, thus avoiding the use of delay lines.

Another object is to provide a head assembly of the above character which is constructed in such a manner as to provide simple adjustments for precise location of the transducer units.

Another object is to provide a head assembly which will retain its adjustment during normal usage.

Another object is to provide a head assembly having novel transducer units that are effective over a wide range of signal frequencies, and which employ core materials of high magnetic permeability, such as ferrite.

Another object of the invention is to provide a novel transducer apparatus including a rotary head and tape guiding means, and which makes possible free movement of the tape during fast forward or rewind operations, and accurate presentation of the tape for contact with the transducer units.

Another object of the invention is to provide a novel transducer apparatus of the above character which makes possible precise adjustment of the contact pressure between the tape and the tips of the transducer units.

Another object of the invention is to provide such apparatus with guide means readily removable from the other parts of the machine.

Additional objects and features of the invention will appear from the following description in which the preferred embodiments have been set forth in detail in conjunction with the accompanying drawing.

Referring to the drawing.

Figure 1:
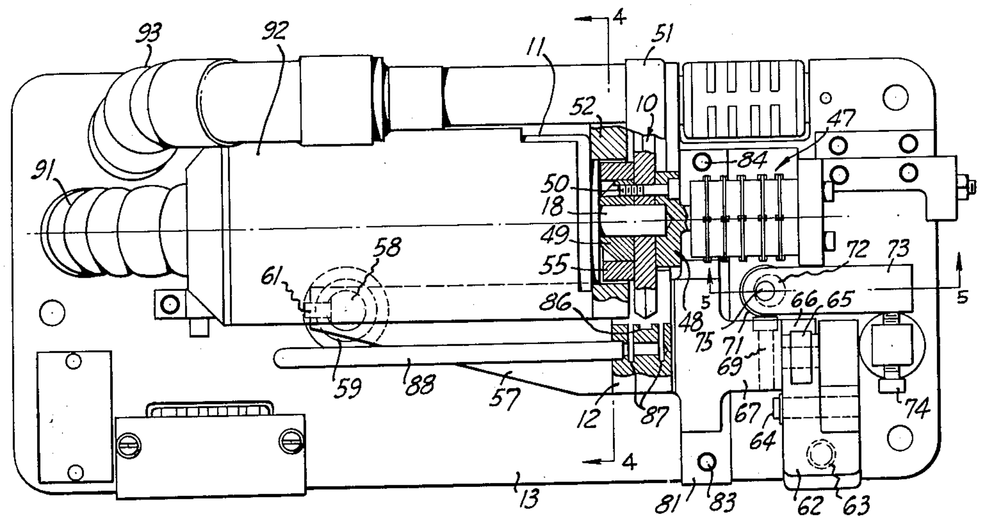
FIGURE 1 is a plan view partly in section illustrating transducing apparatus incorporating the invention.
Figures 2, 13:
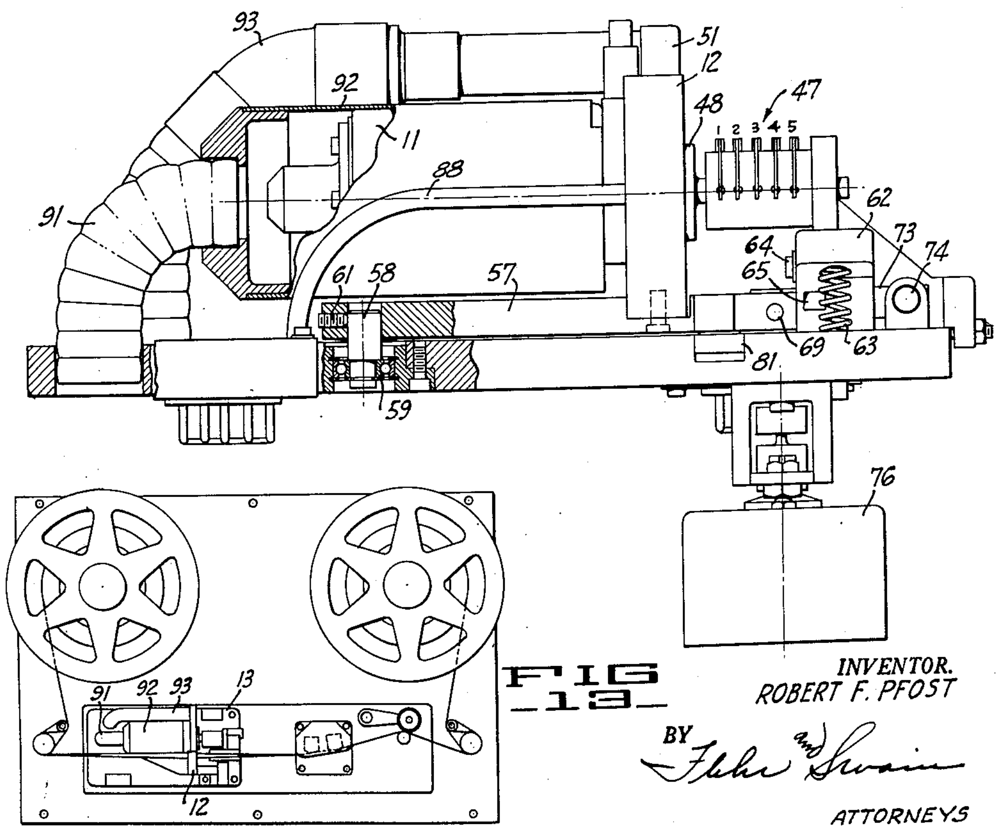
FIGURE 2 is a side elevational view partly in section illustrating the apparatus of FIGURE 1.
FIGURE 13 is a schematic view illustrating the transducer apparatus in conjunction with other parts of a complete tape transport.
Figure 3:
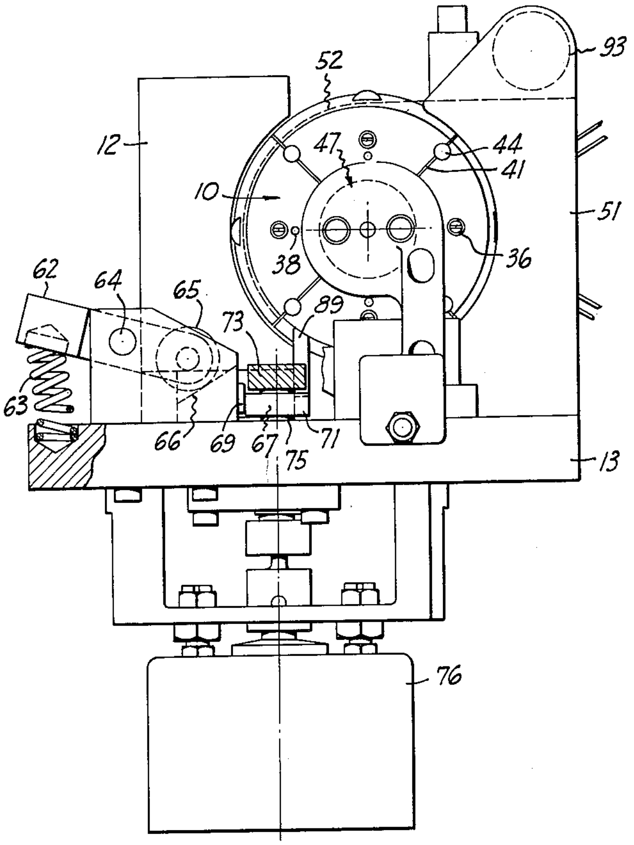
FIGURE 3 is an end view looking toward the right hand end of FIGURE 1 and partly in section.

The apparatus illustrated particularly in FIGURES 1, 2 and 3 consists of a head assembly 10, driven by an electric motor 11. As will be presently explained, the head assembly includes a plurality of transducer units for contact with the tape. Along one side of the head assembly there is a tape guide 12, which is adapted to present the tape to the rotary head assembly. A suitable base plate 13 serves to carry the operating parts, and can be mounted on the top plate or panel of the complete machine.

The preferred construction for the head assembly 10 is shown in FIGURES 6 to 12 inclusive. It consists of a member 16 which is circular in form, and formed of suitable rigid metal or metal alloy. The central opening 17 serves to accommodate the motor shaft 18. A plurality of small transducer units, four in this instance, are mounted upon the member 16 in such a manner that their operating tips protrude from the periphery of the assembly. Each such unit consists of a magnetic core 21 made of material having a low core loss, such as ferrite. In the form illustrated in FIGURE 6, each core is annular with the polar ends of the branches 22 spaced apart. A coil or winding 23 is provided on each core. Each magnetic core is associated with a pair of pole pieces 24 formed of metal or metal alloy of high magnetic permeability, and preferably having a hardness capable of withstanding wear occasioned by contact of the pole pieces with the tape. For example, these parts can be made of Alfenol, which is a metal alloy having high magnetic permeability with relatively good hardness and wear-resisting properties. The tip ends 26 of these pole pieces, which contact the tape, are separated by a thin shim or insert 27 of nonmagnetic material.

Figure 8:
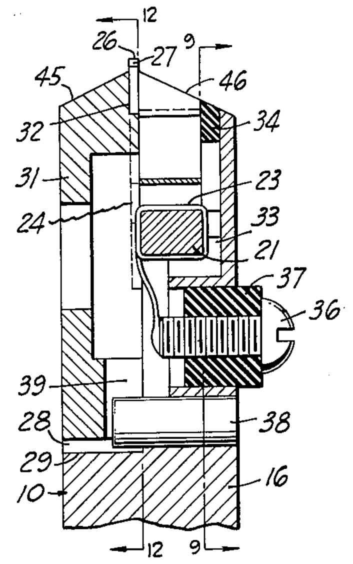
FIGURE 8 is a cross sectional detail on an enlarged scale taken along the line 8—8 of FIGURE 6.
Figure 10:
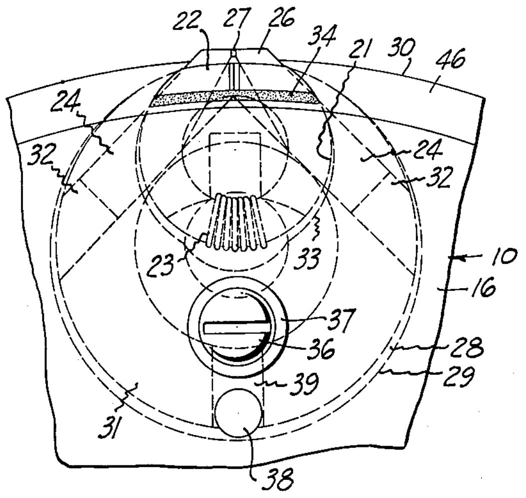
FIGURE 10 is a detail illustrating the pole pieces and associated parts of one of the transducer units and illustrating the manner in which the pole tips protrude from the periphery of the head.
Figure 12:
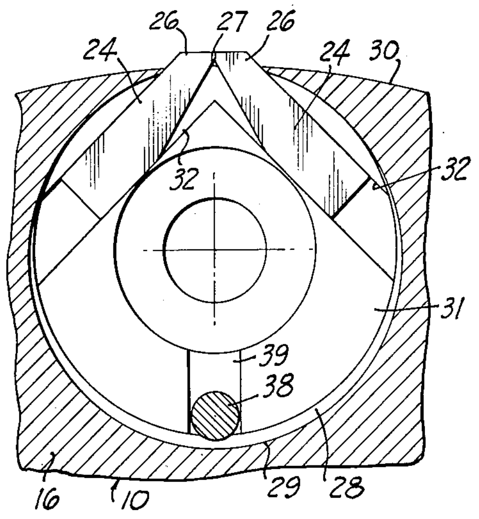
FIGURE 12 is a detail taken along the line 12—12 of FIGURE 8 and showing the manner in which the pole pieces are carried on the inner side of the mounting element.
Figure 9:
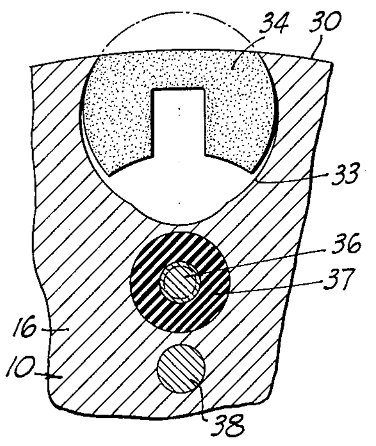
FIGURE 9 is a cross sectional detail taken along the line 9—9 of FIGURE 8.

The parts which serve to mount and retain the transducer units, are in effect interlocked with portions of the member 16. Thus for the mounting of each transducer unit, a marginal portion of the member 16 is provided with a recess 28. The surfaces 29 defining sides of this recess are formed on a circle which extends slightly beyond the periphery 30 of the member 16, as shown in FIGURES 8, 9, 10, and 11. The recess 28 is adapted to accommodate the circularly contoured (i.e. disc-like) mounting element 31. The inner face of each element 31 is provided with grooves 32 disposed in the form of a V, which accommodate the pole pieces 24. Another and deeper circularly contoured recess 33 is dimensioned to accommodate the magnetic core 21. Immediately beneath the core 21 there is a compressible member 34, formed of suitable plastic material or composition, and which serves in the final assembly to maintain pressure contact between the core and the pole pieces 24. One terminal of the coil 23 is grounded, and the other is connected to a terminal screw 36 that is carried by the insulating bushing 37. FIGURES 8 and 12 show a locating pin 38 carried by member 16, and accommodated within the slot 39 formed on the inner side of element 31. Depending somewhat upon methods used for assembly, this pin may or may not be omitted.

During assembly care is taken to obtain accurate location of the pole tips, whereby the angular spacing between the gaps 27 is uniform. However, it has been found impractical if not impossible to manufacture the head assemblies with such a degree of precision that the angular spacing between gaps is exactly uniform and identical for each assembly.

Figure 6:
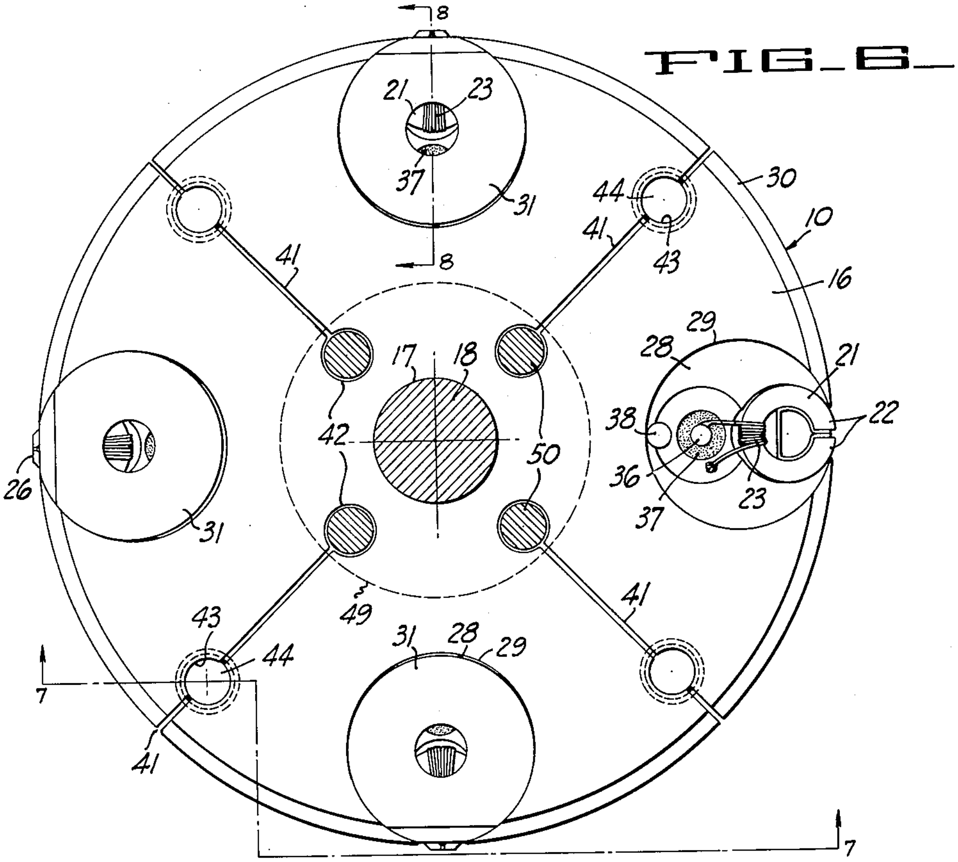
FIGURE 6 is a detail showing the rotary head with the motor shaft shown in section and with the parts broken away.
Figure 7:
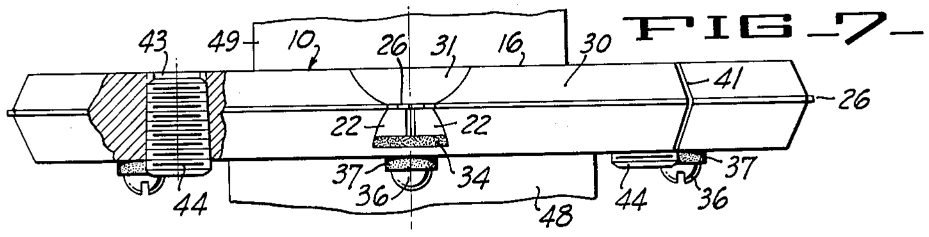
FIGURE 7 is a side elevation of the head shown in FIGURE 6, but with parts broken away to show one of the adjusting screws.
Figure 11:
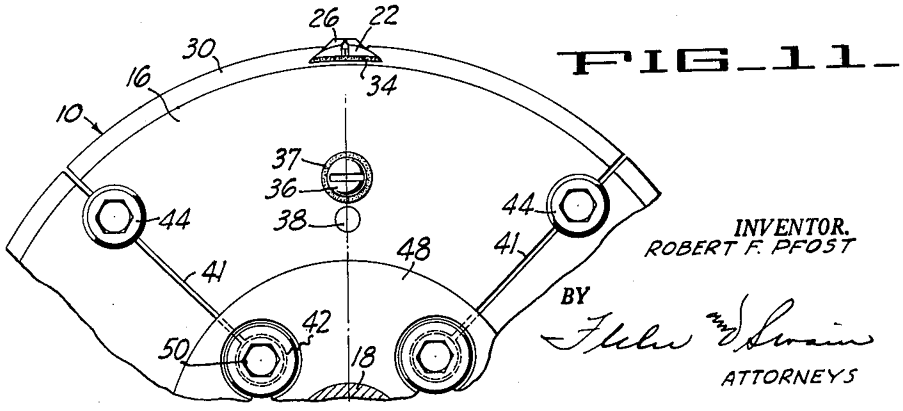
FIGURE 11 is a detail on the same scale as FIGURE 6 showing a portion of the head looking toward the rear side of FIGURE 6 and illustrating the tips of one of the transducer units.

To provide means for precise adjustments the member 16 is divided into a plurality of connected sectors, with each sector serving to mount one of the transducer units. Thus as shown in FIGURE 6 radially extending slots 41 are provided intermediate the transducer units, and these slots extend from the outer periphery to points near the central opening 17. For convenience and to relieve stress, the inner ends of these slots may terminate in the openings 42, which may be used for the attachment of associated parts. Each slot is interrupted by a threaded tapered opening 43 which accommodates an adjusting screw 44. All of the adjusting screws are tapered whereby when a screw is advanced sufficiently far it causes slight spreading of the associated slot.

Various techniques can be employed for assembling the transducer units upon the member 16, and for securing the necessary precise positioning of the parts during various stages of manufacture. While the transducer units are being assembled and located, the adjusting screws 44 are left relatively loose whereby they do not affect the relative angular spacing between the sectors. By means of suitable precision fixtures and instruments, the gaps 27 of the transducer units are located as precisely as possible relative to each other, to provide uniform spacing. Assuming the use of four transducer units, the gaps 27 are located 90° apart. When the parts of a transducer unit are assembled in the position desired, suitable means such as selfsetting resin of the epoxy type can be applied to bond the elements 31 to the member 16. The tips 26 are also accurately ground to protrude the desired amount from the periphery of the assembly, whereby all of the tips lie in a common sweep circle. Thereafter the head assembly is placed in a video recording and/or reproducing machine, and employed for the reproduction of signal information from a standard recorded tape made with a head having accurate redundant adjustment between the gaps of the transducer units. The reproduced picture is observed and the extent of shifting of horizontal bands is noted. The operator now makes adjustments of the screws 44 whereby the angular relationship between adjacent transducer units is adjusted to the extent necessary to avoid picture distortion. The head is now properly adjusted for precise recording and/or playback operations.

Figure 4:
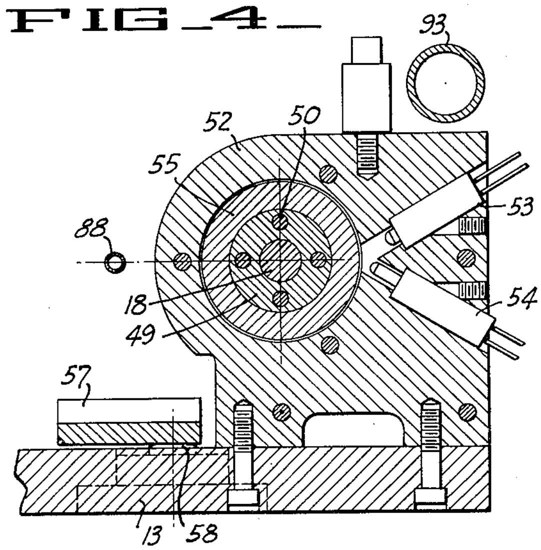
FIGURE 4 is a cross sectional view taken along the line 4—4 of FIGURE 1 on an enlarged scale.

As shown in FIGURE 1, the head assembly 10 is associated with a suitable slipring assembly 47, whereby the terminal leads number 1 to 4 inclusive make connection with the ungrounded terminals of each of the transducer windings. Lead 5 and the slipring connected thereto provides a ground connection. The inner rotatable part of this slipring assembly can be attached to the spider 48, and this spider, together with the head member 16, and a driving hub 49 on the motor shaft, all clamped together by means of screws 50. A part of the head periphery can be enclosed by the housing 51 (FIGURES 1 and 3) which is carried by the base 13. The immediately adjacent housing part 52 can serve to mount and enclose the photoelectric tube 53 and the small lamp 54, (shown in FIGURE 4) together with means for focusing the same upon the periphery of a ring 55 on the hub 49. One portion of this periphery can be darkened, and the remainder light reflecting, whereby circuitry connected to the photoelectric tube serves to generate pulses in synchronism with rotation of the head. Such pulses can be used for motor control and synchronizing operations.

The tape guide 12 is provided with an arcuate inner face 56 which embraces a portion of the periphery of the head. It is fixed to an arm 57 which overlies the base 13, and which has its one end removably attached to the pivot pin 58. This is carried by the bearing assembly 59, and is shown releasably attached to the arm by the set screw 61. The guide member 12 together with arm 57 are movable between limiting positions, in one of which the guide member is retracted with respect to the head whereby a tape is free to move past the guide member without being contacted by the transducer units, and in the other of which the guide is advanced relative to the head whereby the tape is held in contact with the transducer units.

Means is provided whereby the guide member is normally urged toward the head. Thus a lever 62 is urged by compression spring 63, and is secured to the base 13 by the pivot pin 64. The roller 65 carried by one end of this lever engages an inclined cam face 66 formed on the extension 67 of the arm 57. By virtue of the cam face 66 and roller 65, the force of spring 63 normally serves to yieldably urge the arm and the guide toward the head and downwardly toward the base.

A stop screw 69 carried by the extension 67 of arm 57 engages a bearing assembly 71 carried by shaft 72. An arm 73 has its one end secured to shaft 72, and its other end is disposed to engage the adjustable stop screw 74. Suitable motor means such as a solenoid 76 of the rotary type is mounted below the base 13, and has its shaft coupled to a shaft 72 that is journalled within the base, and which has the stub shaft 75 eccentrically attached to the same. When the solenoid 76 is energized, the tape guide member 12 is in its advanced position, and arm 73 is against the stop 74. When solenoid 76 is not energized, as for tape rewind operations, arm 73 is rotated a limited amount in a counterclockwise direction as viewed in FIGURE 1, whereby the eccentricity between shafts 72 and 75 causes displacement of arm 57, with the result that the guide member is retracted for free movement of the tape.

When it is desired to remove the guide together with arm 57 from the machine, the operator operates the lever 62 to compress spring 63 sufficiently far to release the roller 65 with respect to the cam face 66. Thereafter the arm 57 can be removed together with the guide.

Figure 5:
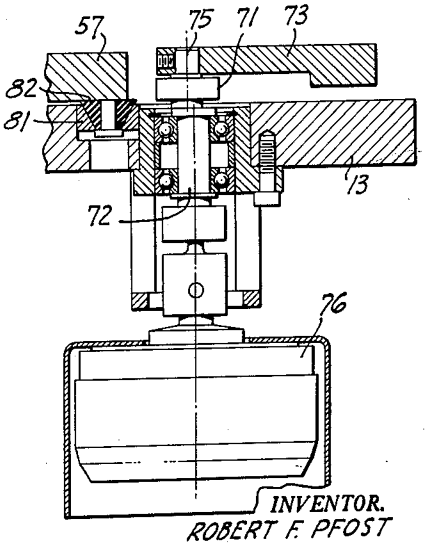
FIGURE 5 is a detail illustrating the motive means for moving the tape guide and taken along the line 5—5 of FIGURE 1 (scale enlarged).

It is desirable to steady the arm 57 by supplemental guide means near its free end. It is also desirable to provide means for adjusting the vertical height of said guide means whereby the height of the arm 57 may be controlled. For this purpose a slide bar assembly 81 is fitted within an accommodating slot formed in the base 13. The slide bar assembly has one of its ends fixedly secured to the base by means of a bolt 83. The other end is adjustably secured to the base 13 by a bolt 84 which has a differential thread arrangement for adjusting the height of this end of the slide bar assembly. Vertical movement of the slide bar serves to vertically position the arm 57 which rests thereon. Teflon inserts 82 (FIGURE 5) are secured to the slide bar for the purpose of providing smooth low friction suspension points on which the arm can move.

The arcuate surface 56 of the guide member 12 is preferably provided with an arrangement of grooving or recesses as shown in FIGURE 1. Thus a groove 86 is formed in a plane corresponding to the plane of rotation of the transducer units. Additional grooves 87 are provided adjacent the sides of the groove 86, and are adapted to be connected by flexible tube 88 to a source of suction. Suction applied during normal operation, that is, during recording and/or playback operations, serves to retain the exterior side of the tape in intimate contact with the guide surface. As shown in FIGURE 3 an abutment 89 is provided at the lower end of the guide member, and serves to engage one edge of the tape. It is assumed in this instance that the head rotates in a counterclockwise direction as viewed in FIGURE 3.

It is desirable to provide pneumatic cooling for the motor. Thus a duct 91 connects with one end of the motor housing 92 and is connected to a suitable source of suction whereby cooling air is continuously drawn through the motor windings. It is also desirable to provide pneumatic means for withdrawing dust from the tape and from the vicinity of the rotating head. For this purpose the housing part 51 is hollow and is connected to a similar suction duct 93, whereby air is continuously drawn from the region of contact between the head and the tape, thus removing dust or other fine particles.

Operation of the complete transducer apparatus will be apparent from the foregoing. FIGURE 13 schematically illustrates how tape is applied to the guide means 12, and is driven by a capstan drive. During normal recording and/or playback operations, the guide is advanced toward the head, the precise position in this instance being determined by the setting of stop screw 74. From time to time this screw can be adjusted to compensate for wear of the transducer tips. Such adjustments serve to adjust the contact pressure between the tape and the transducer tips. During fast forward or tape rewind operations, the solenoid 76 is de-energized to retract the guide member, whereby the tape is free to move without contacting the transducer units.

The particular head construction described makes possible economies in manufacture, while at the same time permitting high precision with respect to the location of the gaps of the transducer units. By means of the features described, it is possible to build and assemble the head within reasonable mechanical tolerances, and thereafter effect adjustments which make for exact precision. The use of such a head obviates the use of delay lines for both recording and/or playback operations.

I claim:

1. In tape transducing apparatus, a drumlike head member formed of rigid material, said member being rotatable about a central axis and being provided with a plurality of slots extending inwardly from its outer periphery whereby said member is divided into a plurality of connected sectors, a plurality of transducer units carried by said member, each unit being mounted upon a corresponding sector, the operating tips of said transducer units being disposed in a common circular sweep path for contact with a tapelike recording medium, and members disposed between adjacent sectors for adjusting the angular relationship between the same.

2. In tape transducing apparatus, a drumlike head member formed of rigid metal and rotatable about a central axis, said member being divided into a plurality of sectors by slots extending from the outer periphery of the same towards the central axis, a plurality of transducer units carried by said member, each transducer unit being mounted upon a corresponding sector, said units having tape engaging operating tips disposed to sweep in a common circular path to contact tape, a plurality of threaded openings formed in said member between adjacent sectors, and tapered screws engaging said openings whereby the turning of said screws serves to adjust the angular relationship between adjacent sectors and adjacent transducer units.

3. In tape transducer apparatus, a drum-like head member formed of rigid material, said member being rotatable about a central axis and including a plurality of circumferentially spaced portions, said portions being mounted for circumferential movement relative to each other, a plurality of transducer units carried by said member, each unit being mounted upon a corresponding portion, and means connected to adjacent portions for adjusting the relative circumferential position of said portions, thereby affording adjustment of the angular position of each transducer unit relative to the adjacent transducer units.

References Cited in the file of this patent

UNITED STATES PATENTS

| | | |
|---|---|---|
| 1,409,439 | Fayer | Mar. 14, 1922 |
| 2,291,687 | Brobst | Aug. 4, 1942 |
| 2,493,742 | Begun et al. | Jan. 10, 1950 |
| 2,530,584 | Pontius | Nov. 21, 1950 |
| 2,647,755 | Townsley | Aug. 4, 1953 |
| 2,735,901 | Coates et al. | Feb. 21, 1956 |
| 2,750,449 | Thompson et al. | June 12, 1956 |
| 2,751,438 | Baer | June 19, 1956 |
| 2,813,924 | Coutant et al. | Nov. 19, 1957 |
| 2,862,064 | Wallace | Nov. 25, 1958 |
| 2,862,067 | Christoff | Nov. 25, 1958 |
| 2,892,901 | Lyon | June 30, 1959 |
| 2,897,290 | Lyon | July 28, 1959 |

FOREIGN PATENTS

| | | |
|---|---|---|
| 276,766 | Switzerland | Oct. 16, 1951 |
| 737,323 | Great Britain | Sept. 21, 1955 |